(12) United States Patent  (10) Patent No.: US 8,907,884 B2
Thompson et al.  (45) Date of Patent: Dec. 9, 2014

(54) LED BACKLIGHT SYSTEM

(75) Inventors: Paul M. Thompson, San Jose, CA (US);
Floriano Kim, Saratoga, CA (US);
Mark A. Yoshimoto, San Jose, CA (US)

(73) Assignee: Apple Inc., Cupertino, CA (US)

(*) Notice: Subject to any disclaimer, the term of this patent is extended or adjusted under 35 U.S.C. 154(b) by 460 days.

(21) Appl. No.: 12/683,414

(22) Filed: Jan. 6, 2010

(65) Prior Publication Data
US 2011/0164069 A1 Jul. 7, 2011

(51) Int. Cl.
G09G 3/36 (2006.01)
H05B 33/08 (2006.01)
G09G 3/34 (2006.01)

(52) U.S. Cl.
CPC ........ *G09G 3/342* (2013.01); G09G 2320/0233 (2013.01); G09G 2320/0633 (2013.01); *H05B 33/0818* (2013.01); G09G 2320/0247 (2013.01); G09G 2320/064 (2013.01); Y02B 20/346 (2013.01)
USPC .............. 345/102; 349/61; 362/561

(58) Field of Classification Search
USPC .......... 345/102; 349/61–70; 362/561
See application file for complete search history.

(56) References Cited

U.S. PATENT DOCUMENTS

| 7,250,596 | B2 | 7/2007 | Reime | |
|---|---|---|---|---|
| 2005/0068289 | A1* | 3/2005 | Diefenbaugh et al. | 345/102 |
| 2007/0262948 | A1* | 11/2007 | Han et al. | 345/102 |
| 2008/0001547 | A1* | 1/2008 | Negru | 315/189 |
| 2008/0202312 | A1* | 8/2008 | Zane et al. | 84/297 R |
| 2008/0284692 | A1 | 11/2008 | Chao et al. | |
| 2009/0026977 | A1* | 1/2009 | Omi | 315/294 |
| 2009/0051629 | A1 | 2/2009 | Price et al. | |
| 2009/0079363 | A1 | 3/2009 | Ghoman et al. | |
| 2009/0096741 | A1* | 4/2009 | Kim | 345/102 |
| 2009/0187925 | A1 | 7/2009 | Hu et al. | |
| 2009/0189539 | A1 | 7/2009 | Deng et al. | |
| 2009/0225020 | A1 | 9/2009 | Ran et al. | |
| 2009/0251071 | A1 | 10/2009 | Gater et al. | |
| 2009/0256797 | A1 | 10/2009 | DeClercq et al. | |
| 2010/0149428 | A1* | 6/2010 | Kishimoto | 348/725 |
| 2010/0194792 | A1* | 8/2010 | Lanchava et al. | 345/691 |

FOREIGN PATENT DOCUMENTS

| CN | 101401058 | 4/2009 |
|---|---|---|
| CN | 101610621 | 12/2009 |
| DE | 102007044476 A1 | 3/2009 |
| EP | 2048648 * | 4/2009 |

(Continued)

OTHER PUBLICATIONS

PCT International Search Report for related application PCT/US2010/04731 dated Dec. 3, 2010, 12 pgs.

(Continued)

*Primary Examiner* — Alexander Eisen
*Assistant Examiner* — Cory Almeida
(74) *Attorney, Agent, or Firm* — Fletcher Yoder PC (57) ABSTRACT

A method and system for modifying the pulse width modulation frequency for controlling the backlit illumination intensity of a liquid crystal display. The modified pulse width modulation frequency may be selected to reduce distortion in the display while allowing for a wide range of dimming settings for the display. A pulse width modulation signal may be also be phase shifted such that a string of light sources may be sequentially activated to generate a effective frequency greater than that of the frequency of the pulse width modulation signal.

24 Claims, 8 Drawing Sheets

(56) References Cited

FOREIGN PATENT DOCUMENTS

| | | |
|---|---|---|
| EP | 2048648 A2 | 4/2009 |
| JP | 10111487 A | 4/1998 |
| JP | 2005505180 A | 2/2005 |
| JP | 200891311 A | 4/2008 |
| JP | 200932497 A | 2/2009 |
| JP | 2009042302 A | 2/2009 |
| JP | 2009175382 A | 8/2009 |
| JP | 20093270 A | 7/2010 |
| KR | 20090037281 A | 4/2009 |
| KR | 20090076330 A | 7/2009 |
| KR | 20100006320 A | 1/2010 |
| TW | 200844931 A | 11/2008 |
| WO | 2008149267 A1 | 12/2008 |
| WO | 2009010916 A2 | 1/2009 |

OTHER PUBLICATIONS

Korean Search Report for Korean Patent Application No. 10-2012-7020427 dated Aug. 23, 2012; 8 pages.

Chinese Office Action for CN Application No. 201080001276.1, issued Apr. 25, 2013, pp. 1-2.

Japanese Office Action for Japanese Application No. 2012-548001 issued Sep. 4, 2013; 4 pgs.

European Office Action for European Application No. 10757128.3 dated Apr. 2, 2014; 5 pgs.

Taiwanese Office Action for Taiwan Application No. 099147021 dated Jan. 24, 2014; 7 pgs.

Mexican Office Action for Mexican Application No. MX/a/2012/007978 dated Apr. 23, 2014; 3 pgs.

* cited by examiner

LED BACKLIGHT SYSTEM

BACKGROUND

The present disclosure relates generally to controlling the backlight illumination source of a liquid crystal display.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices increasingly include display screens as part of the user interface of the device. As may be appreciated, display screens may be employed in a wide array of devices, including desktop computer systems, notebook computers, and handheld computing devices, as well as various consumer products, such as cellular phones and portable media players. Liquid crystal display (LCD) panels have become increasingly popular for use in display screens. This popularity can be attributed to their light weight and thin profile, as well as the relatively low power it takes to operate the LCD pixels.

The LCD typically makes use of backlight illumination because the LCD does not emit light on its own. Backlight illumination typically involves supplying the LCD with light from a cathode fluorescent lamp or from light emitting diodes (LEDs). To reduce power consumption, groupings of LEDs may be utilized such that the groupings are activated individually. However, this configuration may lead to reduced resolution, distortion or artifacts, and/or limited brightness adjustment ranges. Therefore, there exists a need for controlling LEDs of an LCD through techniques that minimize resolution loss, reduce distortion or artifacts, as well as allow for broad dimming ranges for the LCD.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to a backlight unit for a display device, such as an LCD display. In one embodiment, an edge-lit backlight unit may include an architecture of stings of LEDs, each with a certain number of light sources per string. For example, a grouping of six strings of LEDs each with 3 LEDs thereon may be utilized. Control of the activation and deactivation of the strings may be generated via a pulse width modulator (a pulse width modulation device). The strings may be activated in such a manner that the first string is activated, followed by the second string, and so forth. The activation of these strings may cause LEDs thereon to emit light. Furthermore, the strings may be activated at a relatively high frequency, such as 8 kHz. The 8 kHz frequency of the strings combined with a total number of strings utilized, such as 6 strings, may yield an effective (or equivalent) frequency of 48 kHz on the display.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The application is generally directed to a method and system for controlling backlighting of a display. A pulse width modulator (PWM) signal may be transmitted to a display. Through the control of the duty cycle of the PWM signal, the brightness of the display may be adjusted. Furthermore, the PWM signal may be provided to each of a group of LED strings, each with a series of LEDs thereon. The PWM signal may be provided to the LED strings, for example, in a sequential manner. The frequency at which the PWM signal may be transmitted to each of the LED strings may be a relatively high frequency, for example, 8 kHz. Rapidly transmitting the PWM signal to the LED strings in this manner may reduce visual artifacts on the display while maintaining a reduced overall power consumption of the display, since less than all of the strings may be activated at any given time. Moreover, the PWM signal may be phase shifted to allow for generation of an effective frequency on the display at a rate greater than the frequency of the PWM signal.

Figure 1:
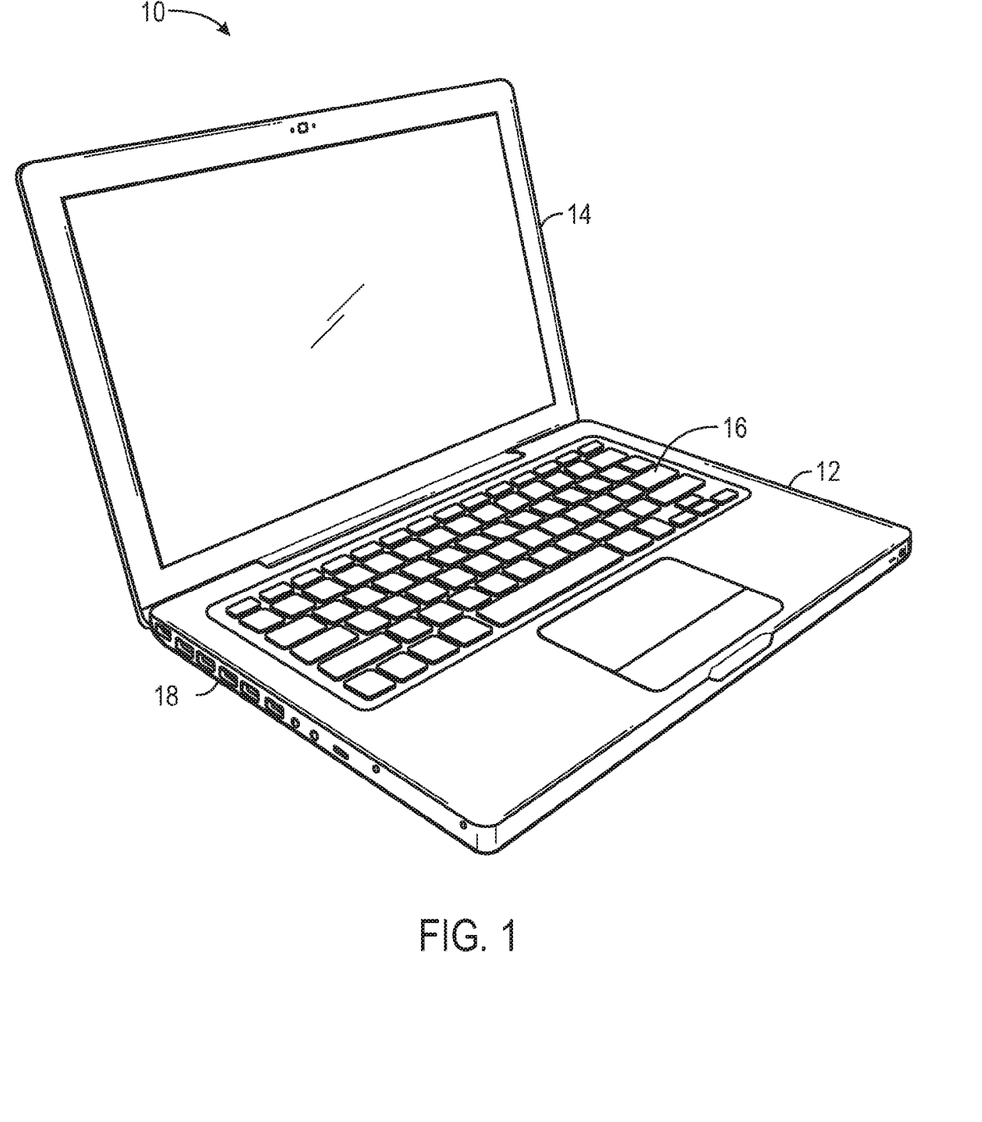
FIG. 1 is a perspective view illustrating an electronic device, in accordance with one embodiment of the present invention.

An electronic device 10 is illustrated in FIG. 1 in accordance with one embodiment of the present invention. In some embodiments, including the presently illustrated embodiment, the device 10 may be a portable electronic device, such as a laptop computer. Other electronic devices may also include a viewable media player, a cellular phone, a personal data organizer, or the like. Indeed, in such embodiments, a portable electronic device may include a combination of the functionalities of such devices. In addition, the electronic device 10 may allow a user to connect to and communicate through the Internet or through other networks, such as local or wide area networks. For example, the portable electronic device 10 may allow a user to access the Internet and to communicate using e-mail, text messaging, or other forms of electronic communication. By way of example, the electronic device 10 may be a model of a MacBook®, MacBook® Pro, MacBook Air®, iMac®, Mac® mini, or Mac Pro® available from Apple Inc. of Cupertino, Calif. In other embodiments, the electronic device may include other models and/or types of electronic devices employing LED backlights, available from any manufacturer.

In certain embodiments, the electronic device 10 may be powered by one or more rechargeable and/or replaceable batteries. Such embodiments may be highly portable, allowing a user to carry the electronic device 10 while traveling, working, and so forth. While certain embodiments of the present invention are described with respect to a portable electronic device, it should be noted that the presently disclosed techniques may be applicable to a wide array of other electronic devices and systems that are configured to render graphical data, such as a desktop computer.

In the presently illustrated embodiment, the electronic device 10 includes an enclosure or housing 12, a display 14, input structures 16, and input/output (I/O) ports or connectors 18. The enclosure 12 may be formed from plastic, metal, composite materials, or other suitable materials, or any combination thereof. The enclosure 12 may protect the interior components of the electronic device 10, such as processors, circuitry, and controllers, among others, from physical damage, and may also shield the interior components from electromagnetic interference (EMI).

The display 14 may be a liquid crystal display (LCD). The LCD may be a light emitting diode (LED) based display or some other suitable display. As noted above, the electronic device 10 may also include input structures 16. In one embodiment, one or more of the input structures 16 are configured to control the device 10, such as by controlling a mode of operation, an output level, an output type, etc. For instance, the input structures 16 may include a button to turn the device 10 on or off. Further the input structures 16 may allow a user increase or decrease the brightness of the display 14. Embodiments of the portable electronic device 10 may include any number of input structures 16, including buttons, switches, a control pad, a keypad, or any other suitable input structures that may be used to interact with electronic device 10. These input structures 16 may operate to control functions of the electronic device 10 and/or any interfaces or devices connected to or used by the electronic device 10. For example, the input structures 16 may allow a user to navigate a displayed user interface, such as a graphical user interface (GUI), and/or other applications running on the electronic device 10.

The device 10 may also include various I/O ports 18 to allow connection of additional devices. For example, the device 10 may include any number of input and/or output ports 18, such as headphone and headset jacks, universal serial bus (USB) ports, IEEE-1394 ports, Ethernet and modem ports, and AC and/or DC power connectors. Further, the electronic device 10 may use the I/O ports 18 to connect to and send or receive data with any other device, such as a modem, networked computers, printers, or the like. For example, in one embodiment, the electronic device 10 may connect to an iPod via a USB connection to send and receive data files, such as media files.

Figure 2:
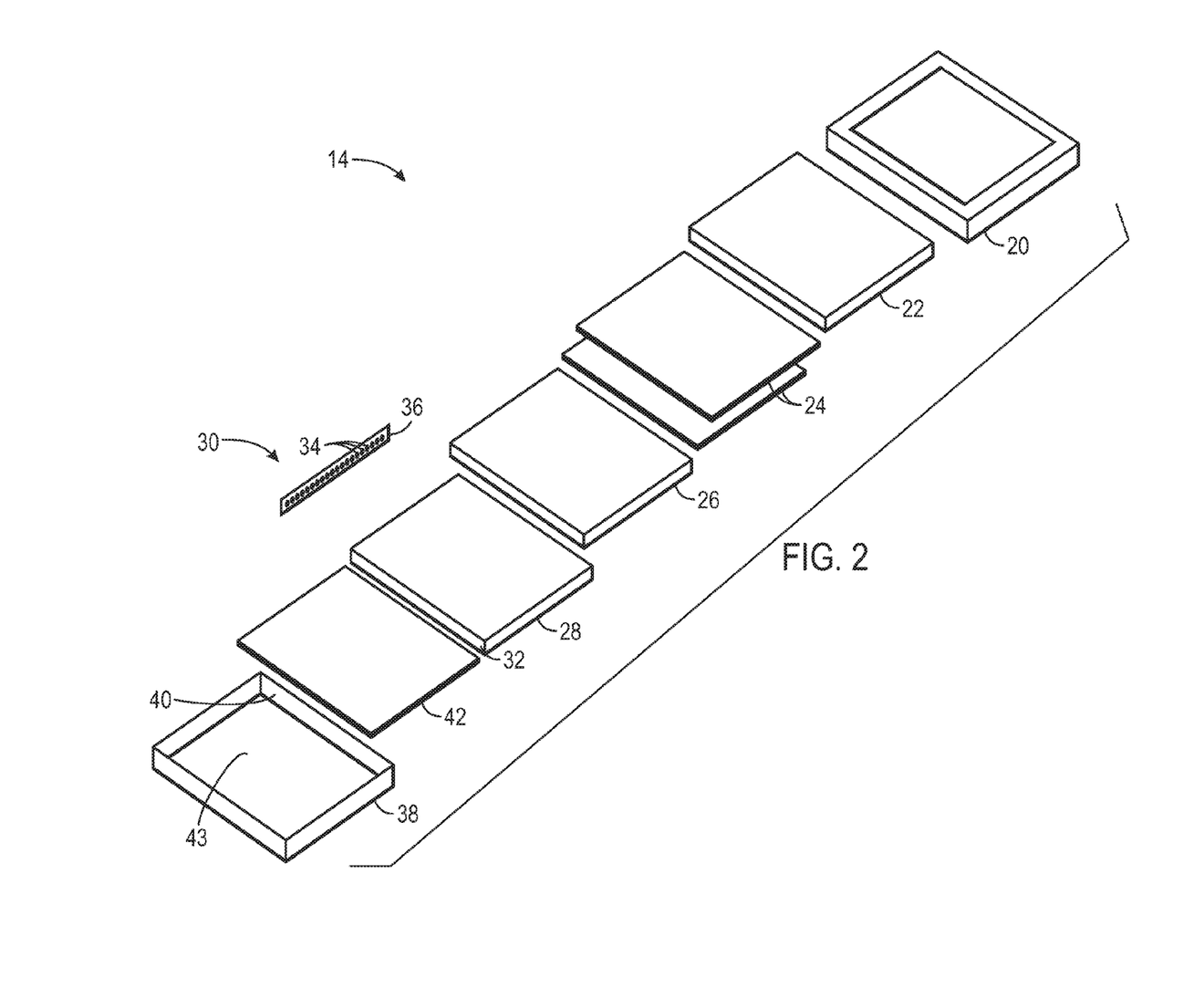
FIG. 2 is an exploded perspective view of an LCD, in accordance with one embodiment of the present invention.

Additional details of the display 14 may be better understood through reference to FIG. 2, which is an exploded perspective view of one example of the LCD type display 14. The display 14 includes a top cover 20. The top cover 20 may be formed from plastic, metal, composite materials, or other suitable materials, or any combination thereof. In one embodiment, the top cover 20 is a bezel. The top cover 20 may also be formed in such a way as combine with a bottom cover 38 to provide a support structure for the remaining elements illustrated in FIG. 2. A liquid crystal display (LCD) panel 22 is also illustrated. The LCD panel 22 may be disposed below the top cover 20. The LCD panel 22 may be used to display an image through the use of a liquid crystal substance typically disposed between two substrates. For example, a voltage may be applied to electrodes, residing either on or in the substrates, creating an electric field across the liquid crystals. The liquid crystals change in alignment in response to the electric field, thus modifying the amount of light which may be transmitted through the liquid crystal substance and viewed at a specified pixel. In such a manner, and through the use of various color filters to create colored sub-pixels, color images may be represented across individual pixels of the display 14 in a pixelated manner.

The LCD panel 22 may include a group of individually addressable pixels. In one embodiment, LCD panel 22 may include a million pixels, divided into pixel lines each including one thousand pixels. The LCD panel 22 may also include a passive or an active display matrix or grid used to control the electric field associated with each individual pixel. In one embodiment, the LCD panel 22 may include an active matrix utilizing thin film transistors disposed along pixel intersections of a grid. Through gating actions of the thin film transistors, luminance of the pixels of the LCD panel 22 may be controlled. The LCD panel 22 may further include various additional components, such as polarizing films and anti-glare films.

The display 14 also may include optical sheets 24. The optical sheets 24 may be disposed below the LCD panel 22 and may condense the light passing to the LCD panel 22. In one embodiment, the optical sheets 24 may be prism sheets which may act to angularly shape light passing through to the LCD panel 22. The optical sheets 24 may include either one or more sheets. The display 14 may further include a diffuser plate or sheet 26. The diffuser plate 26 may be disposed below the LCD panel 22 and may also be disposed either above or below the optical sheets 24. The diffuser plate 26 may diffuse the light being passed to the LCD panel 22. The diffuser plate 26 may also reduce glaring and non-uniform illumination on the LCD panel 22. A guide plate 28 may also assist in reducing non-uniform illumination on the LCD panel 22. In one embodiment, the guide plate 28 is part of an edge type backlight assembly. In an edge type backlight assembly, a light source 30 may be disposed along one side of the guide plate 28, such as the bottom edge 32 of the guide plate 28. The guide plate 28 may act to channel the light emanating from the light source 30 upwards towards the LCD panel 22.

The light source 30 may include light emitting diodes (LEDs) 34. The LEDs 34 may be a combination of red, blue, and green LEDs, or the LEDs 34 may be white LEDs. In one embodiment, the LEDs 34 may be arranged on a printed circuit board (PCB) 36 adjacent to an edge of the guide plate 28, such as bottom edge 32, as part of an edge type backlight assembly. In another embodiment, the LEDs 34 may be arranged on one or more PCBs 36 along the inside surface of bottom cover 38. For example, the one or more PCBs 36 may be aligned along an inner side 40 of the bottom cover 38. The LEDs 34 may be arranged in one or more strings, whereby a number of the LEDs 34 are coupled in series with one another in each string. For example, the LEDs 34 may be grouped into six strings, whereby each string includes three LEDs 34 connected in series. However, it should be noted, that as few as one or two LED 34 may be connected on each string or more than three LEDs 34, such as six LEDs, may be connected on each string. Furthermore, the strings may be positioned in an end to end configuration, a side by side configuration, and/or in any other suitable configuration.

The display 14 also may include a reflective plate or sheet 42. The reflective plate 42 is generally disposed below the guide plate 28. The reflective plate 42 acts to reflect light that has passed downwards through the guide plate 28 back towards the LCD panel 22. Additionally, the display includes a bottom cover 38, as previously discussed. The bottom cover 38 may be formed in such a way as to combine with the top cover 20 to provide a support structure for the remaining elements illustrated in FIG. 2. The bottom cover 38 may also be used in a direct-light type backlight assembly, whereby one or more light sources 30 are located on a bottom edge 43 of the bottom cover 38. In this configuration, instead of using a light source 30 positioned adjacent the diffuser plate 26 and/or guide plate 28, the reflective plate 42 may be omitted and one or more light sources (not shown) on the bottom edge 43 of the bottom cover 38 may emit light directly towards the LCD panel 22.

Figure 3:
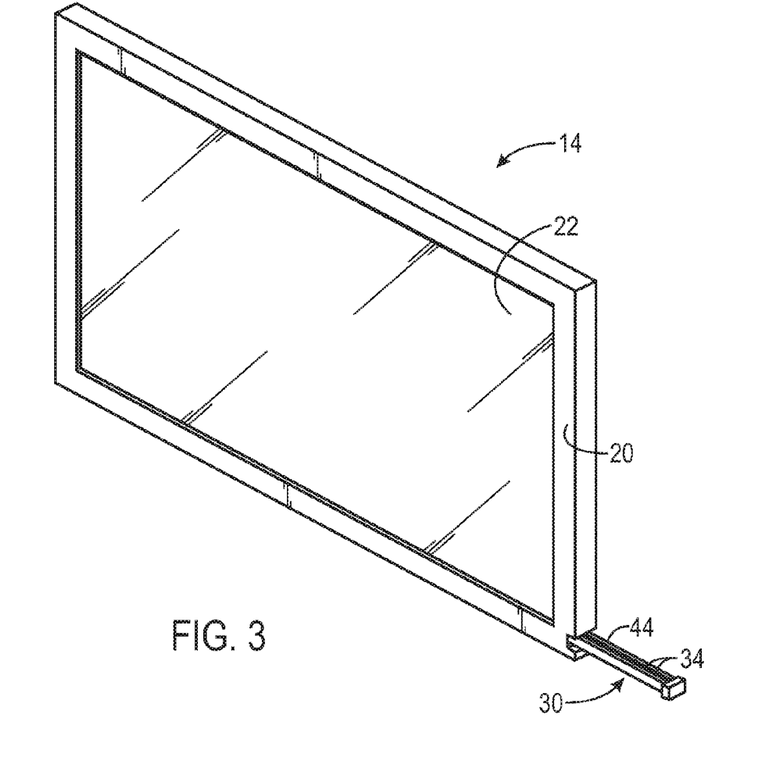
FIG. 3 is a perspective view illustrating an LCD that may be used in the electronic device of FIG. 1, in accordance with one embodiment of the present invention.

FIG. 3 depicts an embodiment of display 14 employing an edge-lit backlight. Display 14 includes the LCD panel 22 held in place, as illustrated, by the top cover 20. As described above, the display 14 may utilize a backlight assembly such that a light source 30 may include LEDs 34 mounted on, for example, a Metal Core Printed Circuit Board (MCPCB), or other suitable type of support situated upon an array tray 44 in the display 14. This array tray 44 may be secured to the top cover 20 such that the light source 30 is positioned in the display 14 for light generation, which may be utilized to generate images on the LCD panel 22.

The light source 30 may also include circuitry required to translate an input voltage into an LED voltage usable to power the LEDs 34 of the light source 30. Since the light source 30 may be used in a portable device, it is desirable to use as little power as possible to increase the battery life of the electronic device 10. To conserve power, the light source 30, i.e., the LEDs 34 thereon, may be toggled on and off. In this manner, power in the system may be conserved because the light source 30 need not be powered continuously. Furthermore, this toggling will appear to create constant images to a viewer if the frequency of toggling is kept above at least the flicker-fusion frequency of the human eye, about 30 Hz.

In addition to conserving power, by adjusting the duty cycle (the ratio of the time that the light source 30 is on relative to the amount of time that the light source 30 is on and off) of the toggled light source 30, the overall brightness of the LCD panel 22 may be controlled. For example, a duty cycle of 50% would result in an image being displayed at roughly half the brightness of constant backlight illumination. In another example, a duty cycle of 20% results in an image being displayed at roughly 20% of the brightness that constant backlight illumination would provide. Thus, by adjusting the duty cycle of a toggled signal, the brightness of a displayed image may be adjusted with the added benefit of reducing the power consumed in the electronic device 10.

Figure 4:
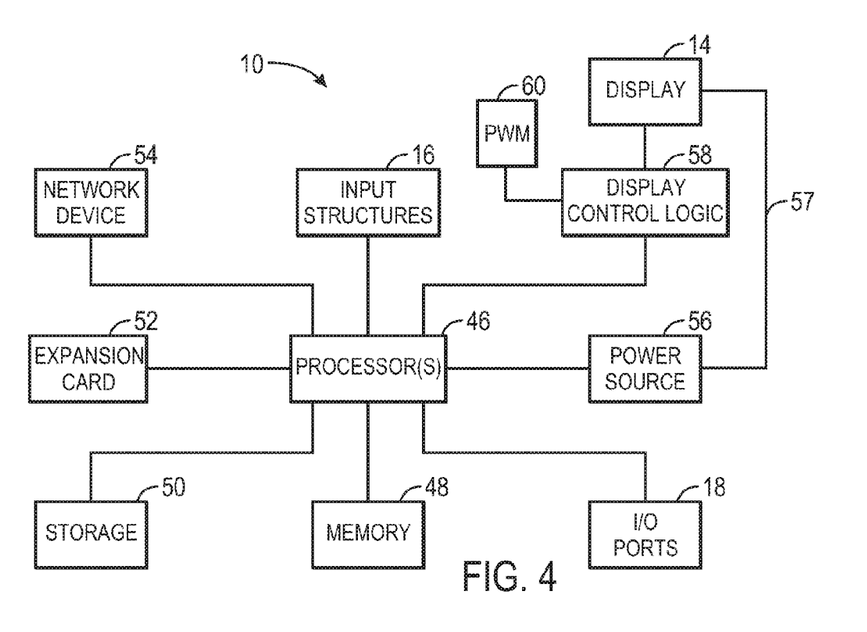
FIG. 4 is a simplified block diagram illustrating components of the electronic device of FIG. 1, in accordance with one embodiment of the present invention.

Internal components of electronic device 10 may be used to accomplish the toggling of the light source 30 in the LCD panel 22. FIG. 4 is a block diagram illustrating the components that may be used to perform the toggling procedure described above. Those of ordinary skill in the art will appreciate that the various functional blocks shown in FIG. 4 may include hardware elements (including circuitry), software elements (including computer code stored on a machine-readable medium) or a combination of both hardware and software elements. It should further be noted that FIG. 4 is merely one example of a particular implementation, other examples could include components used in Apple products such as an iPod®, MacBook®, MacBook® Pro, MacBook Air®, iMac®, Mac® mini, or Mac Pro®, iPhone®, or another electronic device utilizing an LCD.

In the presently illustrated embodiment of the electronic device 10, the components may include the display 14, input structures 16, I/O ports 18, one or more processors 46, a memory device 48, non-volatile storage 50, expansion card(s) 52, a networking device 54, a power source 56, and a display control logic 58. With regard to each of these components, it is first noted that the display 14 may be used to display various images generated by the device 10 and may be provided in conjunction with a touch-sensitive element, such as a touchscreen, that may be used as part of the control interface for the device 10.

The input structures 16 may include the various devices, circuitry, and pathways by which user input or feedback is provided to the processor(s) 46. Such input structures 16 may be configured to control a function of the electronic device 10, applications running on the device 10, and/or any interfaces or devices connected to or used by the device 10. For example, the input structures 16 may allow a user to navigate a displayed user interface or application interface. Non-limiting examples of the input structures 16 include buttons, sliders, switches, control pads, keys, knobs, scroll wheels, keyboards, mice, touchpads, and so forth. User interaction with the input structures 16, such as to interact with a user or application interface displayed on the display 12, may generate electrical signals indicative of user input. These input signals may be routed via suitable pathways, such as an input hub or bus, to the processor(s) 46 for further processing.

Additionally, in certain embodiments, one or more input structures 16 may be provided together with the display 14, such an in the case of a touchscreen, in which a touch sensitive mechanism is provided in conjunction with the display 14. In such embodiments, the user may select or interact with displayed interface elements via the touch sensitive mechanism. In this way, the displayed interface may provide interactive functionality, allowing a user to navigate the displayed interface by touching the display 14.

As noted above, the I/O ports 18 may include ports configured to connect to a variety of external devices, such as a power source, headset or headphones, or other electronic devices (such as handheld devices and/or computers, printers, projectors, external displays, modems, docking stations, and so forth). The I/O ports 18 may support any interface type, such as a universal serial bus (USB) port, a video port, a serial connection port, an IEEE-1394 port, an Ethernet or modem port, and/or an AC/DC power connection port.

The processor(s) 46 may provide the processing capability to execute the operating system, programs, user and application interfaces, and any other functions of the electronic device 10. The processor(s) 46 may include one or more microprocessors, such as one or more "general-purpose" microprocessors, one or more special-purpose microprocessors and/or ASICS, or some combination of such processing components. For example, the processor(s) 46 may include one or more reduced instruction set (RISC) processors, as well as graphics processors, video processors, audio processors, and the like. As will be appreciated, the processor(s) 46 may be communicatively coupled to one or more data buses or chipsets for transferring data and instructions between various components of the electronic device 10.

Programs or instructions executed by the processor(s) 46 may be stored in any suitable manufacture that includes one or more tangible, computer-readable media at least collectively storing the executed instructions or routines, such as, but not limited to, the memory devices and storage devices described below. Also, these programs (e.g., an operating system) encoded on such a computer program product may also include instructions that may be executed by the processor(s) 46 to enable the device 10 to provide various functionalities, including those described herein.

The instructions or data to be processed by the processor(s) 46 may be stored in a computer-readable medium, such as memory 48. The memory 48 may include a volatile memory, such as random access memory (RAM), and/or a non-volatile memory, such as read-only memory (ROM). The memory 48 may store a variety of information and may be used for various purposes. For example, the memory 48 may store firmware for the electronic device 10 (such as basic input/output system (BIOS)), an operating system, and various other programs, applications, or routines that may be executed on the electronic device 10. In addition, the memory 48 may be used for buffering or caching during operation of the electronic device 10.

The components of device 10 may further include other forms of computer-readable media, such as non-volatile storage 50 for persistent storage of data and/or instructions. The non-volatile storage 50 may include, for example, flash memory, a hard drive, or any other optical, magnetic, and/or solid-state storage media. The non-volatile storage 50 may also be used to store firmware, data files, software programs, wireless connection information, and any other suitable data.

The embodiment illustrated in FIG. 4 may also include one or more card or expansion slots. The card slots may be configured to receive one or more expansion cards 52 that may be used to add functionality, such as additional memory, I/O functionality, or networking capability, to electronic device 10. Such expansion cards 52 may connect to device 10 through any type of suitable connector, and may be accessed internally or external to the housing of electronic device 10. For example, in one embodiment, the expansion cards 52 may include a flash memory card, such as a SecureDigital (SD) card, mini- or microSD, CompactFlash card, Multimedia card (MMC), or the like. Additionally, the expansion cards 52 may include one or more processor(s) 46 of the device 10, such as a video graphics card having a GPU for facilitating graphical rendering by device 10.

The components depicted in FIG. 4 also include a network device 54, such as a network controller or a network interface card (NIC), internal to the device 10. In one embodiment, the network device 54 may be a wireless NIC providing wireless connectivity over any 802.11 standard or any other suitable wireless networking standard. The network device 54 may allow electronic device 10 to communicate over a network, such as a personal area network (PAN), a local area network (LAN), a wide area network (WAN), or the Internet. Further, electronic device 10 may connect to and send or receive data with any device on the network, such as portable electronic devices, personal computers, printers, and so forth via the network device 54. Alternatively, in some embodiments, electronic device 10 may not include an internal network device 54. In such an embodiment, an NIC may be added as an expansion card 52 to provide similar networking capability as described above.

Further, the device 10 may also include a power source 56. In one embodiment, the power source 56 may be one or more batteries, such as a lithium-ion polymer battery or other type of suitable battery. The battery may be user-removable or may be secured within the housing of the electronic device 10, and may be rechargeable. Additionally, the power source 56 may include AC power, such as provided by an electrical outlet, and the electronic device 10 may be connected to the power source 56 via a power adapter. This power adapter may also be used to recharge one or more batteries of the device 10. Additionally, as illustrated in FIG. 4, the power source 56 may transmit power to the display 14 across path 57. The use of this power by the display 14 may be regulated by display control logic 58, as discussed below.

The display control logic 58 may be coupled to the display 14 and may be used to control light source 30 of the display 14. Alternatively, the display control logic may be internal to the display 14. In one embodiment, the display control logic 58 may act to toggle the light source 30 on and off. This toggling, for example, may be used to decrease the overall brightness of the display 14 when the power source 56, such as a battery, is being used. Additionally and/or alternatively, when the power source 56 is an AC power source, the overall brightness of the display 14 may be modified simply by raising and/or lowering the constant voltage level supplied to the light source 30.

In one embodiment, control of the brightness level of the display 14 may be adjusted through changing the duty cycle of an activation signal transmitted to the light source 30. For instance, if the duty cycle of the activation signal was 0%, then the light source 30 would remain off and the display 14 would be dark. Conversely, if the duty cycle of the activation signal was 100%, then the display 14 would be at full brightness because the light source 30 would always be active (however, as much power would be consumed as was used in the AC power source example above). In another example, if the duty cycle of the activation signal was at 50%, the display 14 would be at half the brightness of the display 14 being always on, however, the power consumption of the display 14 could be reduced by as much as 50% versus the light source 30 being continuously and fully powered.

Additionally, in an embodiment, control of the brightness level of the display 14 may be adjusted through changing the duty cycle of an activation signal transmitted to the light source 30 in conjunction with adjustment of the amount of current transmitted to the light source 30. This adjustment of the current transmitted to, for example, LED strings of the light source, may occur when the duty cycle of an activation signal (such as a PWM signal) is to be set below a threshold level. For instance, if desired brightness of the display 14 would call for the duty cycle of the activation signal to be less than, for example, 20%, then the duty cycle may be set to 20% and the current to be transmitted to active LED strings of the light source 30 may be reduced. In this manner, the brightness of the display may be adjusted through control of both the duty cycle of an activation signal and through the control of the current transmitted to the light source 30.

In one embodiment, a pulse width modulator (PWM) 60 may provide the activation signal to the light source 30 as a PWM signal. Furthermore, the duty cycle of the PWM signal may be adjusted in response to user initiated changes to the display 14 brightness via, for example, inputs 16. In another embodiment, as described above, the display control logic 58 may be used to automatically adjust the brightness of the display 14 by varying the duty cycle of the PWM signal when the power source 56 is a battery. For example, the duty cycle of the PWM signal may be adjusted based on the amount of internal power remaining in the battery.

In one embodiment, the display control logic 58 may be coupled to the pulse-width modulator (PWM) 60, which may generate a PWM signal. Alternatively, in one embodiment, the PWM 60 may be internal to the display control logic 58. The PWM signal generated by the PWM 60 may be an oscillating signal used to toggle the light source 30 on and off. Moreover, the duty cycle of the PWM signal may be selectable and may vary anywhere from 0-100%. As described previously, the duty cycle of the PWM signal may determine the overall brightness of the display 14. In this manner, the PWM signal may also reduce the overall power consumption of the display 14 by controlling the amount of time that the LEDs 34 of the light source 30 are "on" during any period of time. The PWM signal may also provide high brightness resolution (i.e., at least 10-bit resolution) in the device 10. That is, the PWM signal may allow for 1024 different brightness levels to be achieved by the light source 30.

Figure 5:
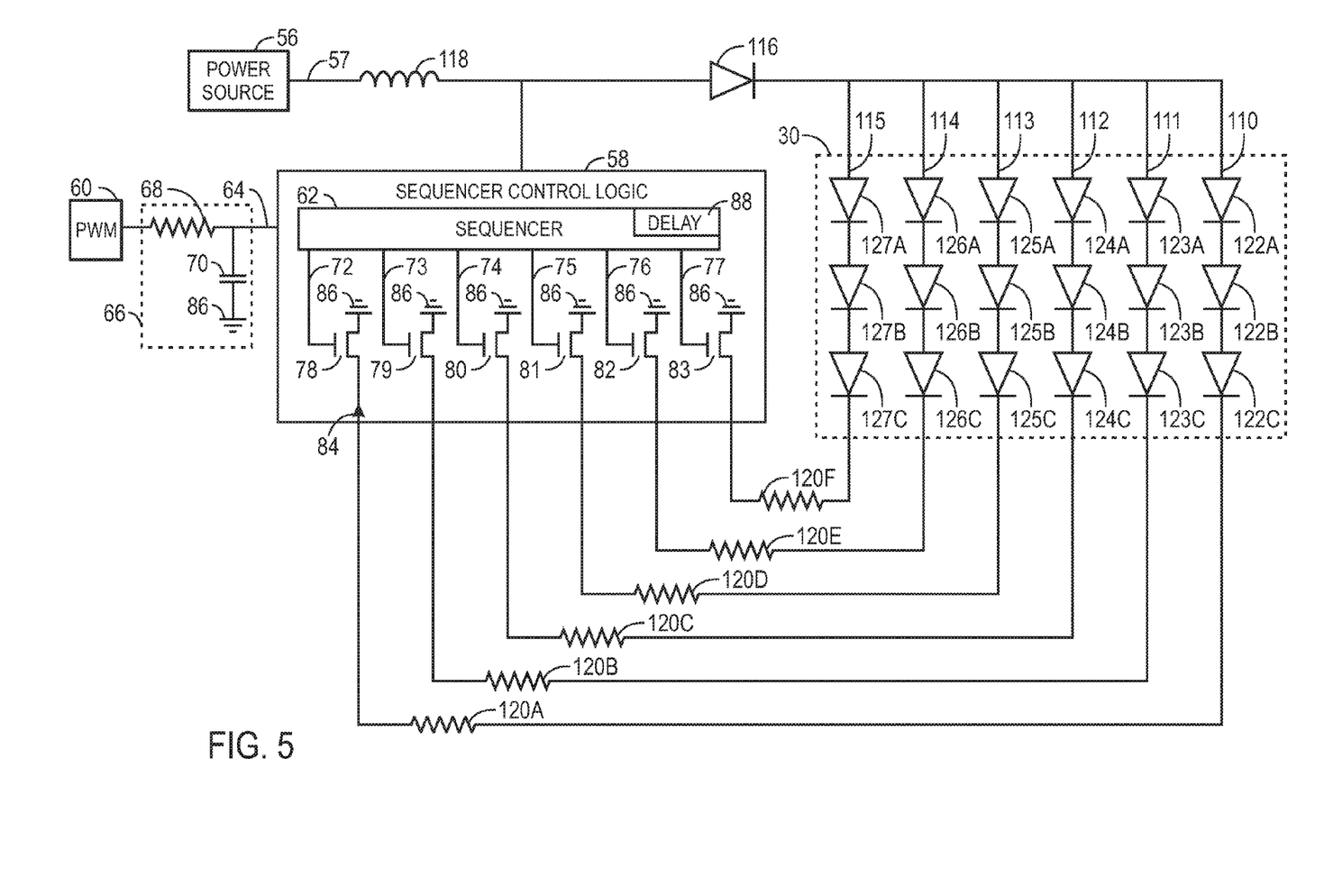
FIG. 5 is a block diagram illustrating components for controlling the backlit illumination intensity the LCD of FIG. 3, in accordance with one embodiment of the present invention.

FIG. 5 is a block diagram illustrating the components controlling the backlit illumination intensity of the display 14. As noted above, the display control logic 58 may operate to control the ratio of time that the LEDs 34 of the light source 30 are on and off. In one embodiment, the LEDs 34 may be activated in a sequential manner to control the overall output of the light source 30. To accomplish this control of the light source 30, the display control logic 58 may include a sequencer 62. The sequencer 62 may, for example, be a microprocessor, one or more special-purpose microprocessors and/or ASICS, a controller, or some combination of such components. The sequencer may operate to receive a PWM signal generated by the PWM 60 and received along path 64. In one embodiment, the PWM signal received from path 64 may be filtered by, for example, a low pass filter 66 including a resistor 68 and a capacitor 70. The resistor 68 and capacitor 70 may be selected in such a manner as to control the amount of smoothing of the PWM signal by the low pass filter 66.

Once the PWM signal is received by the sequencer 62, a determination may be made as to which gate control line 72-77 the PWM signal will be transmitted. It should be noted that while six gate control lines 72-77 are illustrated, more or less than six gate control lines may be utilized. As will be described below in greater detail, each gate control line 72-77 may control a dedicated gate coupled to an individual LED string utilized in the light source 30. That is, there may be one gate control line and a dedicated gate for each LED string in the light source 30.

Each of the gate control lines 72-77 may be coupled to an individual gate 78-83. The gates 78-83 may each be, for example, a field effect transistor (FET) such as a metal-oxide semiconductor field effect transistor (MOSFET). Alternatively, the gates may include other types of switches, transistors, or other components that may connect and break an electrical circuit. In the present embodiment, each gate 78-83 may be activated by the signal transmitted along its corresponding gate control line 72-77. For example, if voltage is transmitted across gate control line 72, gate 78 may be activated. That is, the voltage applied to gate 78 may cause gate 78 to operate as a closed switch, allowing current to flow through the gate 78 along the current path 84 to ground 86. Conversely, if no voltage is transmitted across gate control line 72, gate 78 may be deactivated, causing gate 78 to operate as an open switch, thus preventing current from flowing along the current path 84 through the gate 78 to ground 86.

Additionally, the sequencer 62 may include delay circuitry 88. In one embodiment, the delay circuitry 88 may operate to hold the PWM signal received along path 64 until the sequencer 63 selects a gate control line 72-77 for transmission of the PWM signal. In this manner, the sequencer may allow for a phase shift of the PWM signal received along path 64. In one embodiment, the amount of phase shift performed by the sequencer 62 may be equivalent to the period of the PWM signal divided by the total number of gate control lines 77-83 (i.e. the total amount of LED strings in the light source 30). For example, where six gate control lines 77-83 exist, the sequencer 62 may transmit the PWM signal unaltered to gate control line 72. Subsequently, the sequencer may receive a phase shifted (delayed) PWM signal from the delay circuitry 88 equivalent to the period of the PWM signal delayed by 1/6 of the total period of the PWM signal and may transmit this phase shifted PWM signal to gate control line 73. This process may continue for each of the subsequent gate control lines 74-77, whereby each of the gate control lines 74-77 receives a phase shifted PWM signal delayed by an additional 1/6 of the total period of the PWM signal, relative to the signal transmitted to the preceding gate control line 73-76. This process may be illustrated in FIG. 6.

Figure 6:
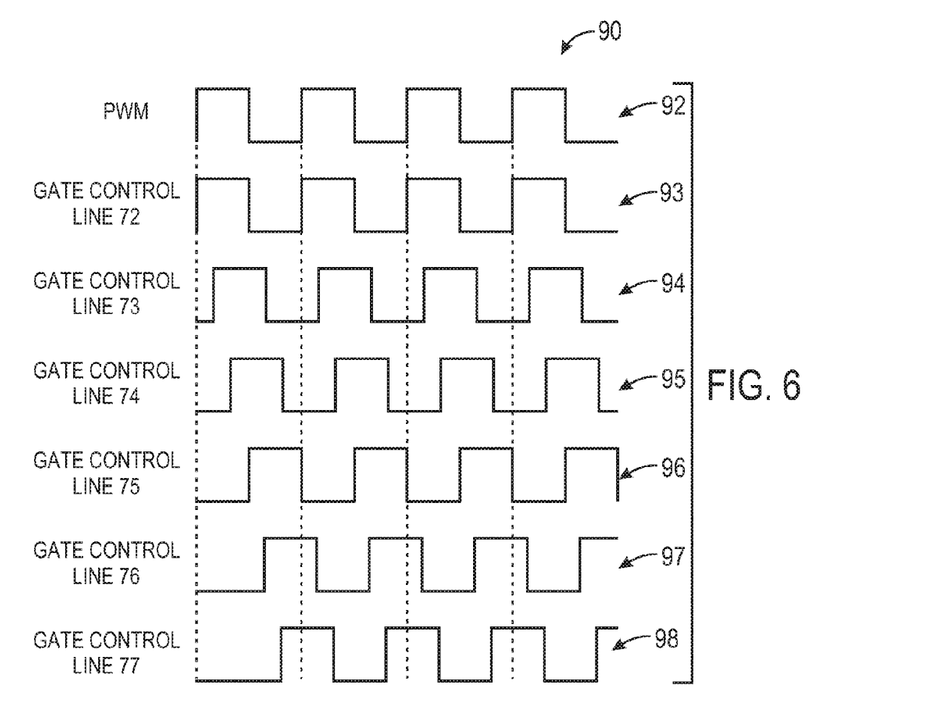
FIG. 6 is a first timing sequence that may be applied to a light source of the LCD of FIG. 3, in accordance with one embodiment of the present invention.

FIG. 6 illustrates a timing sequence 90 that the sequencer 62 may output when utilized with the delay circuitry 88 to phase shift a received PWM signal, as described above. Pulse waveform 92 may represent the PWM signal received by the sequencer 62 from path 64. In one embodiment, the pulse waveform 92 may have a frequency of 8 kHz and a duty cycle of 50%. To phase shift the pulse waveform 92, the sequencer 62 may first transmit the PWM waveform 92 along gate control line 72 as pulse waveform 93. Next, the sequencer 62 may transmit pulse waveform 94 along gate control line 73. As may be seen, pulse waveform 94 may be phase shifted by 1/6 (i.e. 60 degrees) relative to the pulse waveform 92 (i.e. the PWM signal). As noted above, this phase shift may be accomplished by delay circuitry 88. Subsequently, the sequencer 62 may transmit pulse waveform 95 along gate control line 74. As may be seen, pulse waveform 95 may be phase shifted by 1/6 (i.e. 60 degrees) relative to the pulse waveform 94 and by 1/3 (i.e. 120 degrees) relative to pulse waveform 92 (i.e. the PWM signal). This process may continue for pulse waveforms 96-98, transmitted along gate control lines 75-77, respectively. That is, each of the pulse waveforms 96-98 may be phase shifted by 60 degrees relative to the preceding waveform 95-97 and the phase shifting may be accomplished via the delay circuitry 88. The total effect of phase shifting with respect to the pulse waveforms 93-98 may be such that the 8 kHz PWM waveform 92 may lead to an effective rate frequency (i.e. the product of the frequency of the pulse waveforms 93-98 by the total number of gate control lines 72-77) of 48 kHz on the display 14.

Figure 7:
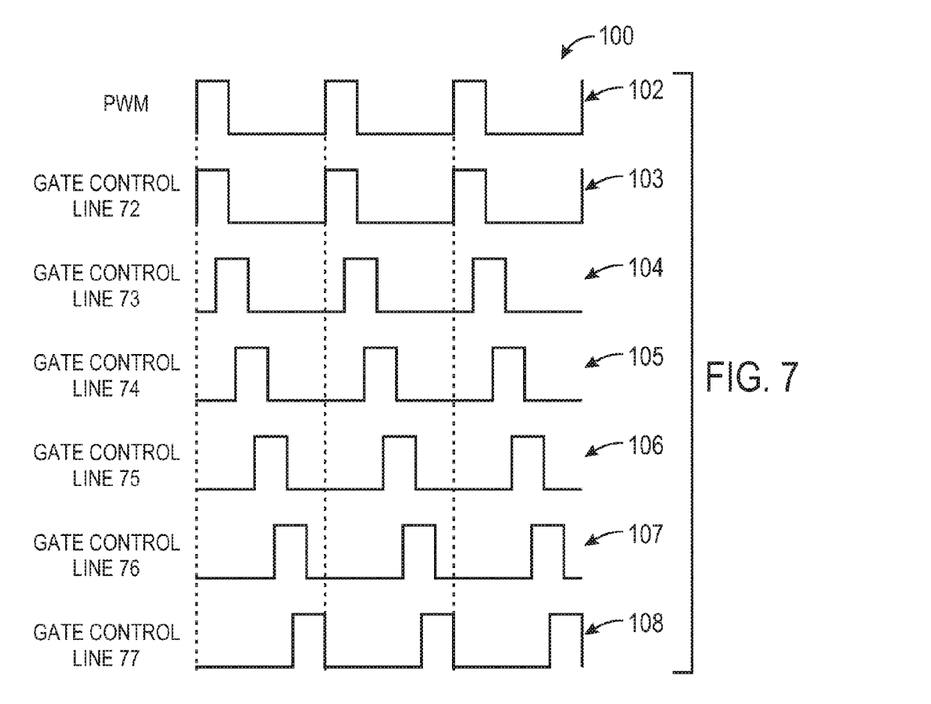
FIG. 7 is a second timing sequence that may be applied to a light source of the LCD of FIG. 3, in accordance with one embodiment of the present invention.

FIG. 7 illustrates a timing sequence 100 that the sequencer 62 may output when utilized with the delay circuitry 88 to phase shift a received PWM signal. Pulse waveform 102 may represent the PWM signal received by the sequencer 62 from path 64. In one embodiment, the pulse waveform 102 may have a frequency of 8 kHz and a duty cycle of 25%. To phase shift the pulse waveform 102, the sequencer 62 may first transmit the PWM waveform 102 along gate control line 72 as pulse waveform 103. Next, the sequencer 62 may transmit pulse waveform 104 along gate control line 73. As may be seen, pulse waveform 104 may be phase shifted by ⅙ (i.e. 60 degrees) relative to the pulse waveform 102 (i.e. the PWM signal). As noted above, this phase shift may be accomplished by delay circuitry 88. Subsequently, the sequencer 62 may transmit pulse waveform 105 along gate control line 74. As may be seen, pulse waveform 105 may be phase shifted by ⅙ (i.e. 60 degrees) relative to the pulse waveform 104 and by ⅓ (i.e. 120 degrees) relative to pulse waveform 102 (i.e. the PWM signal). This process may continue for pulse waveforms 106-108, transmitted along gate control lines 75-77, respectively. That is, each of the pulse waveforms 106-108 may be phase shifted by 60 degrees relative to the preceding waveform 105-107 and the phase shifting may be accomplished via the delay circuitry 88. The total effect of phase shifting with respect to the pulse waveforms 103-108 may be such that an 8 kHz PWM waveform 102 may lead to an effective rate frequency (i.e. the product of the frequency of the pulse waveforms 103-108 by the total number of gate control lines 72-77, also the total number of LED strings in the light source 30) of 48 kHz on the display 14.

Returning to FIG. 5, if the sequencer 62 selects gate control line 72, the PWM signal received from path 64 (which may be phase shifted via delay circuitry 88) may be transmitted along gate control line 72 to gate 78. As the PWM signal is an oscillating signal that fluctuates between no voltage and a high voltage (Vcc), the gate 78 will be activated and deactivated in conjunction with the pulses of the PWM signal. As will be discussed in greater detail below, the alternating activation and deactivation of the gate 78 will cause an LED string (e.g., LED string 110) to be activated and deactivated in a synchronized manner with the gate 78. That is, as gate 78 is activated, current may flow along current path 84.

This current may be supplied by the power source 56 and may pass through, for example, the LED string 110. Moreover, to insure that the current flows only in a direction from the power source 56, through any given LED string 110-115 and through the selected gate 78-83, and to ground 86, a diode 116 may be placed between the power source 56 and the LED strings 110-115. This diode may generally prevent current from flowing from the LED strings 110-115 back towards the power source 56. Furthermore, at least one inductor 118 may be placed in series with the diode 116 so as to resist abrupt changes in current from the power source 56, thus operating to smooth the current transmitted to the LED strings 110-115, as well as to provide boost functionality for a backlight controller of the display 14. That is, the input voltage may be boosted in relation to the number of LEDs present on each LED string 110-115 to properly bias the LEDs. Additionally, resistances may be present in FIG. 5. These resistances may be illustrated as resistors 120A-120F. The resistors 120A-120F may, for example, represent the internal resistance of the various lines on which the resistors 120A-120F are illustrated. In another embodiment, specific resistance values may be selected for resistors 120A-120F as required to alter performance characteristics of, for example, the display 14 (e.g., for debugging).

As current passes from the power source 56 through the diode 116 and, for example, to LED string 110 (when gate 78 has been activated), the current will cause the LEDs 122A-122C located on LED string 110 to generate light. It should be noted that LEDs 122A-122C may be identical to LEDs 34 discussed above. In the present embodiment, three LEDs (e.g., LEDs 122A-122C) may be placed in series as part of a respective LED string (e.g., LED string 110); however, it should be noted that greater or less than three LEDs, such as six LEDs, may be utilized in conjunction with a given LED string (e.g., LED string 110).

In operation, the activation and deactivation of the various gates 78-83 via a PWM signal transmitted along the control lines 72-77 may, thus, control the activation and deactivation of the LED strings 110-115. The activation and deactivation of the LED strings 110-115 may, in turn, control the activation of the LEDs 122A-127C thereon. As such, the sequencer 62 may, by providing the PWM signal to the various gate control lines 72-77, control the operation of the various LED strings 110-115 in the light source 30.

Moreover, the sequencer 62 may actively select which of the LED strings 110-115 will generate light at a given time. As illustrated in flow chart 128 of FIG. 8, the sequencer 62 may receive a PWM signal generated by the PWM 60 in step 130. In step 132, the sequencer 62 may determine the sequence to be initiated. Step 132 may include determining the order of transmitting the PWM signal to the gate control lines 72-77, the use of the delay circuitry 88 to initiate a phase shift of the received PWM signal prior to transmission to gate control lines 72-77, and/or other steps as required for control of the light source 30.

Figure 8:
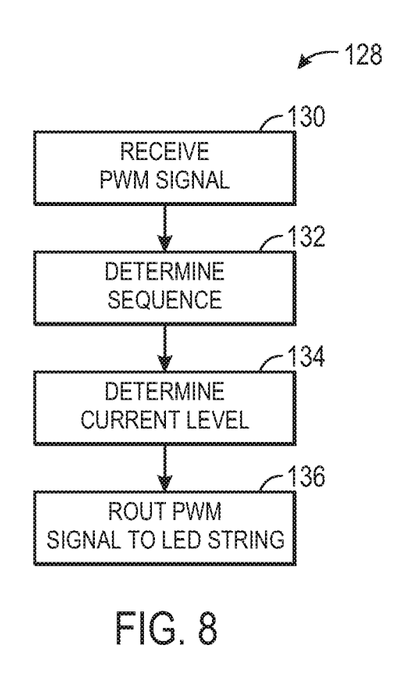
FIG. 8 is flow diagram illustrating the operation of the components of FIG. 5, in accordance with one embodiment of the present invention.

In step 134, the sequencer may determine if the current level to be transmitted to the LED strings 110-115 should be reduced. As previously noted, control of the brightness level of the display 14 may be adjusted through changing the duty cycle of the PWM signal in conjunction with an adjustment to the amount of current transmitted to the light source 30. This adjustment of the current transmitted to the LED strings 110-115, selected in the sequencing step of 132, may occur when the brightness level of the display 14 is to be set below a threshold level. For instance, if desired brightness of the display 14 would otherwise call for the duty cycle of the PWM signal to be less than, for example, 20%, then the duty cycle of the PWM signal may be set to 20% and the current to be transmitted to active LED strings 110-115 of the light source 30 may be reduced. This reduction may, for example, be set by the display controller 58. If, however, the duty cycle of the PWM signal is to be set above a threshold level, for example, 20%, then the brightness level of the display 14 could be controlled by the duty cycle of the PWM signal without modification of the current passing through the activated LED strings 110-115.

Subsequent to step 134, the sequencer 62, in step 136, may route the PWM signal (which may be phase shifted) to the LED strings 110-115. This routing may be accomplished in a sequential manner. That is, the PWM signal may be sequentially transmitted to gate control line 72 for a given cycle of the PWM signal. The sequencer 62 may then transmit the PWM signal for a subsequent cycle to gate control line 73. This procedure may continue in sequence for each gate control line until the sequencer 62 transmits a PWM signal to gate control line 77. Once the PWM signal has been transmitted to gate control line 77, the sequencer may restart the process of transmitting the PWM signal to gate control line 72. In this manner, each of the LED strings 110-115 may be enabled sequentially. This sequential activation may be performed as previously discussed with respect to FIGS. 6 and 7, that is, with a phase shift. Additionally or alternatively, the sequential activation may be accomplished without the use of the delay circuitry 88, and without phase shift, as illustrated in FIGS. 9 and 10.

Figure 9:
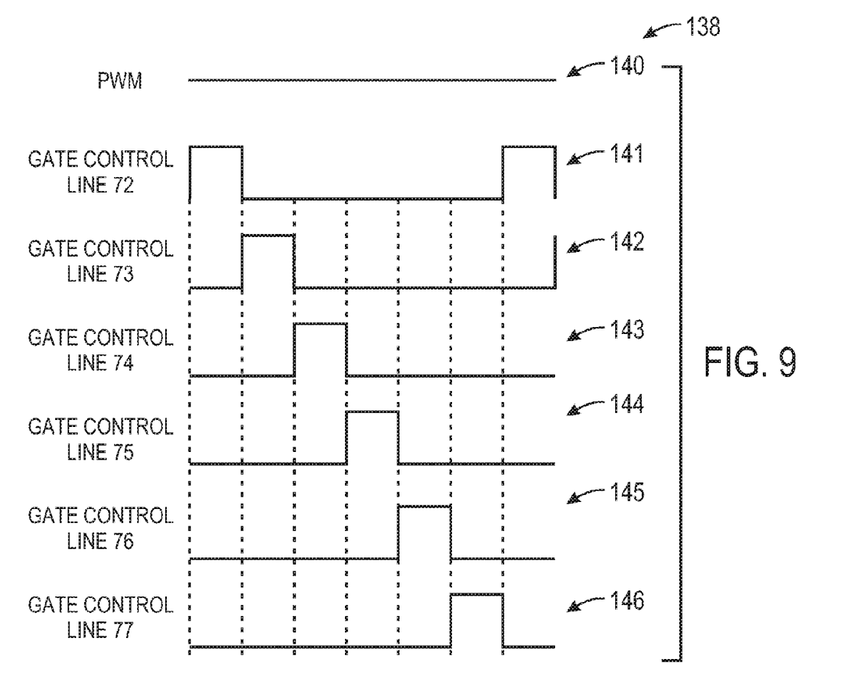
FIG. 9 is an additional timing sequence that may be applied to a light source of the LCD of FIG. 3, in accordance with one embodiment of the present invention.

FIG. 9 illustrates a timing sequence 138 that the sequencer 62 may employ in an embodiment. Pulse waveform 140 may represent the PWM signal received by the sequencer 62 from path 64. The pulse waveform 140 may have a frequency of at least approximately 1 kHz and a duty cycle of 100%. To activate the various LED strings 110-115, the sequencer 62 may first transmit the PWM waveform 140 along gate control line 72 as pulse waveform 141. Subsequently pulse waveform 140 may be transmitted to gate control line 73 and so forth until pulse waveform 140 is transmitted to gate control line 77 as pulse waveform 146. Accordingly, the pulse waveforms 141-146 may correspond to the pulses transmitted to each of the gate control lines 72-77. As each pulse is received at each of the gates 78-83 associated with the gate control lines 72-77, the pulse may allow for current to flow through the respective LED string (e.g., LED string 110) thus generating light for use in the display 14. It should be noted that in the illustrated embodiment the PWM pulse waveform 140 transmitted to each of the gate control lines 72-77 may have a duty cycle of 100%. That is, at least one of the LED strings 110-115 is always activated.

Figure 10:
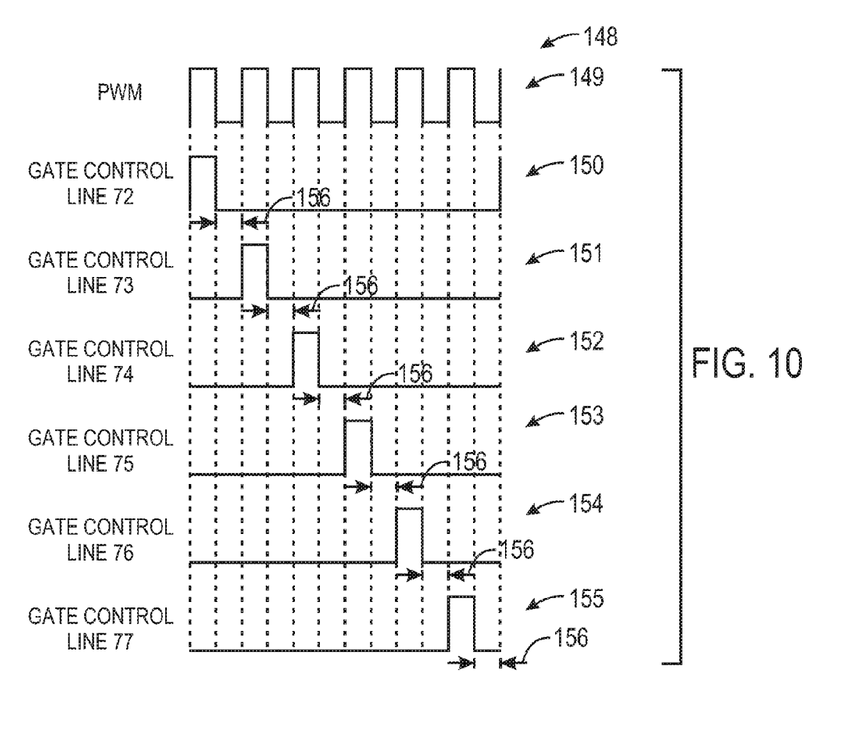
FIG. 10 is another timing sequence that may be applied to a light source of the LCD of FIG. 3, in accordance with one embodiment of the present invention.

FIG. 10 illustrates a timing sequence 148 that the sequencer 62 may employ in an embodiment whereby the PWM signal is at a 50% duty cycle. Pulse waveform 149 may represent the PWM signal received by the sequencer 62 from path 64. The pulse waveform 149 may have a frequency of at least approximately 1 kHz and a duty cycle of 50%. To activate the various LED strings 110-115, the sequencer 62 may first transmit the PWM waveform 149 along gate control line 72 as pulse waveform 150. Subsequently pulse waveform 149 may be transmitted to gate control line 73 and so forth until pulse waveform 149 is transmitted to gate control line 77 as pulse waveform 155. Accordingly, the pulse waveforms 150-155 may correspond to the pulses transmitted to each of the gate control lines 72-77. As each pulse is received at each of the gates 78-83 associated with the gate control lines 72-77, the pulse may allow for current to flow through the respective LED string (e.g., LED string 110) thus generating light for use in the display 14. It should be noted that in the illustrated embodiment the PWM pulse waveform 149 transmitted to each of the gate control lines 72-77 may have a duty cycle of 50%. Thus, each of pulse waveforms 150-155 have a gap of time 156 in which none of the LED strings 110-115 are active. Moreover, each the gaps of time 156 may be equivalent to the time that voltage is driven to the gates 78-83, activating each of the LED strings 110-115. Thus, taken in the aggregate, the light source 30 may be transmitting light at a 50% duty cycle. This, for example, may cause the display 14 to be at 50% the brightness as generated via the timing sequence 138 (which, in turn, is dimmer than that provided by timing sequences 90 and 100 above).

Accordingly, the pulse waveforms 93-98, 103-108, 141-146, and 150-155 may correspond to the pulses transmitted to each of the gate control lines 72-77, depending on the desired frequency and duty cycle of the display 14. Furthermore, in one embodiment, the amount that the duty cycle of the PWM signal is varied may directly correspond to the amount that the display 14 is dimmed. Thus, it is envisioned that the duty cycle of the PWM signals transmitted along path 64 may be varied from 0-100%. Additionally, as discussed above, the sequencer 62 may sequentially rotate the pulses received from the PWM signal amongst the gate control lines 72-77 at a high frequency, for example, at an effective rate of 48 kHz so as to minimize distortion and artifacts on the display 14.

In one embodiment, the sequencer 62 may activate each of the LED strings 110-115 at a high frequency. Activating the LED strings 110-115 at a high frequency may be beneficial as artifacts that might typically be seen from the use of only one LED string (e.g., LED string 110) may be reduced if the LED strings 110-115 are activated and deactivated at a high rate. In one embodiment, each of the LED strings 110-115 may be selected by the sequencer 62 at a rate of approximately 8 kHz. Thus, in the embodiment where six LED strings 110-115 are utilized, with a phase shift as illustrated in each of FIGS. 6 and 7, the effective frequency for the display 14 would be 48 kHz (i.e. the product of the frequency of selection of each of the LED strings 110-115 by the sequencer 62 and the total number of LED strings 110-115). In another embodiment, the each of the LED strings 110-115 may be selected by the sequencer 62 at a greater or lesser rate, such as at a rate of approximately at least 1 kHz, 2 kHz, 3 kHz, 4 kHz, 5 kHz, 6 kHz, 7 kHz, 8 kHz, 9 kHz, or 10 kHz. This may lead to an effective rate of approximately at least 6 kHz, 12 kHz, 18 kHz, 24 kHz, 30 kHz, 36 kHz, 42 kHz, 48 kHz, 54 kHz, or 60 kHz. Regardless of the frequency selected by the sequencer 62, through the use of high frequency activation and deactivation, as well as through the use of a PWM signal and/or through phase shifting of the PWM signal to activate the LED strings 110-115, a large dimming range for the display 14 as well as removal of visual artifacts on the display 14 may be concurrently accomplished.

Figure 11:
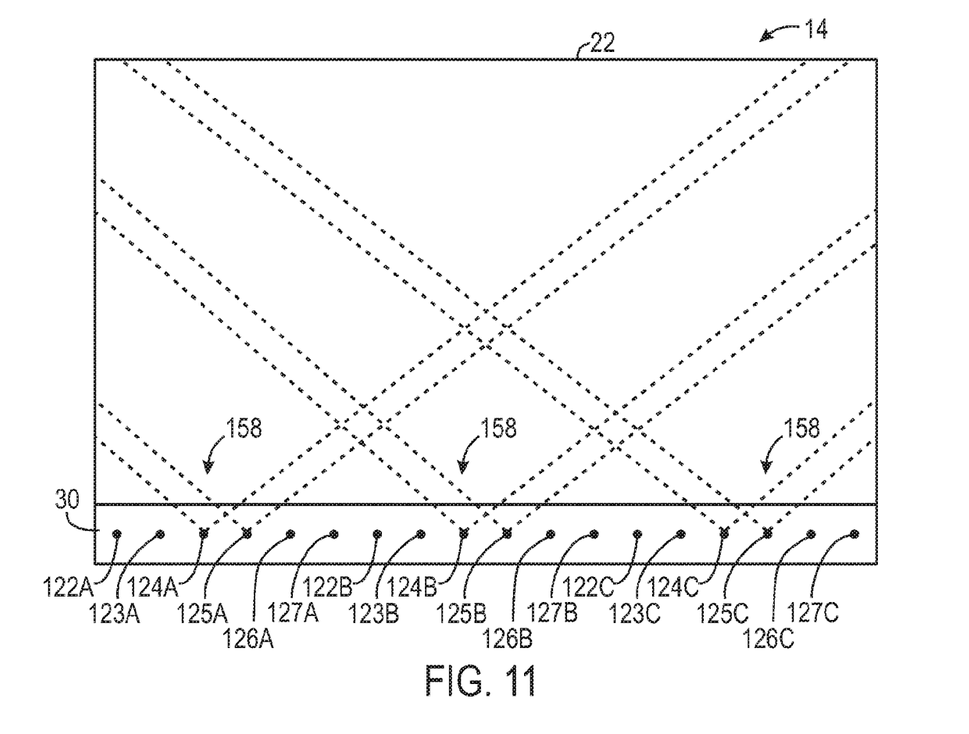
FIG. 11 is a front view of the LCD display of FIG. 3, in accordance with one embodiment of the present invention.

FIG. 11 illustrates a front view of the display 14 in which the duty cycle of a phase shifted PWM signal is applied to gate control lines 74 and 75, causing the activation of LED strings 112 and 113. As illustrated, the display 14 includes the LCD panel 22 and the light source 30. The light source 30 includes LEDs 122A-127C, which may be organized into LED strings 110-115. The display 14 is shown, for example, as the phase shifted PWM signal is being transmitted to gate control lines 74 and 75, thus activating gates 80 and 81. As gates 80 and 81 are activated, current is free to pass through LED strings 112 and 113, which, in turn, activate LEDs 124A-124C and 125A-125C. Accordingly, light may be generated by LEDs 124A-125C, resulting in light transmitted to the LCD panel 22. This transmitted light is represented by light cones 158. As illustrated, these light cones 158 may overlap in such a manner as to reduce optical beating or other artifacts. That is, the overlap of the light cones 158 generated by LEDs 122A-127C allow for a more complete coverage of the display 14. This overlap, in conjunction with the high effective PWM dimming frequency (i.e., equal to the product of the base PWM frequency times the number of phase-shifted LED strings), may reduce optical beating (or other artifacts) that may otherwise occur as a result of interference between the dimming frequency and the display refresh frequency, for example.

Figure 12:
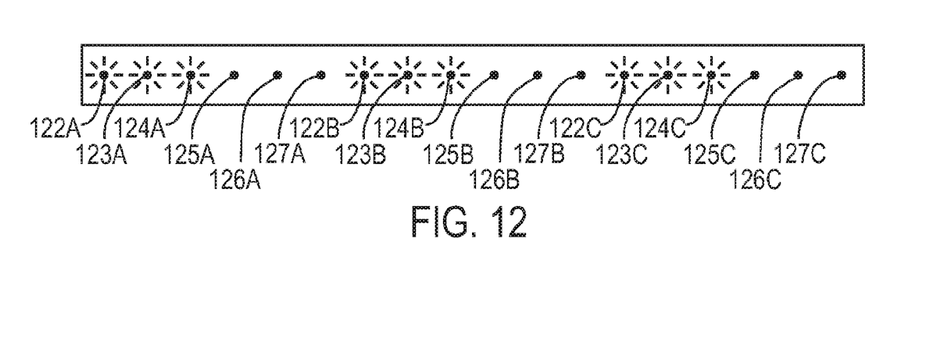
FIG. 12 is a top view of a light source of FIG. 3, in accordance with one embodiment of the present invention.

In a phase shift embodiment, as pulse waveform 95 is being transmitted to gate control line 74, gate 80 is activated As gate 80 is activated, current is free to pass through LED string 112, which, in turn, activates LEDs 124A-124C. Accordingly, light may be generated by LEDs 124A-124C, resulting in light transmitted to the LCD panel 22. This may be illustrated in FIG. 12, which shows a top view of the light source 30. As illustrated in FIG. 12, LEDs 124A-124C are activated as pulse waveform 95 goes high. However, as may be seen in FIG. 6, as pulse waveform 95 goes high, pulse waveforms 93 and 94 are also high. Accordingly, each of LEDs 122A-122C and 123A-123C may be active as pulse waveform 95 goes high.

Figure 13:
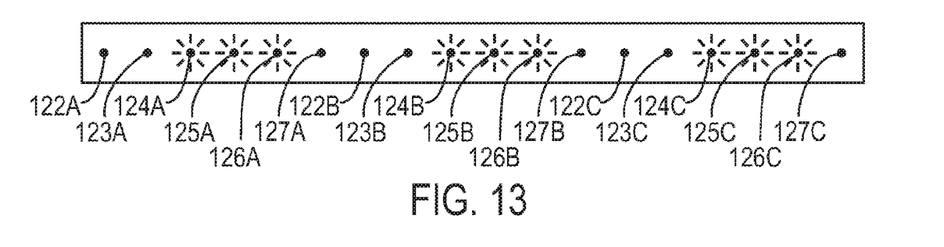
FIG. 13 is a top view of the light source of FIG. 3, in accordance with one embodiment of the present invention.

Additionally, FIG. 13 shows a top view of the light source 30 as pulse waveform 95 is about to transition from high to low. As illustrated in FIG. 13, LEDs 124A-124C are active as pulse waveform 95 is about to transition from high to low. However, as may be seen in FIG. 6, as pulse waveform 95 nears its transition to low, pulse waveforms 96 and 97 remain high. Accordingly, each of LEDs 125A-125C and 126A-126C may be active as pulse waveform 95 nears the transition from high to low. Thus, FIGS. 12 and 13, taken in conjunction, illustrate the phase shift activation of LED strings 110, 111, 113, and 114 as LED string 112 is sequentially activated and deactivated.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device, comprising:
a display panel comprising a plurality of pixels;
a light source comprising a plurality of light emitting diode (LED) strings adapted to generate light to illuminate the plurality of pixels;
a sequencer configured to receive an PWM signal and to phase shift the PWM signal to create an effective frequency for controlling the LED strings, wherein an amount of phase shift applied to each LED string is based on a number of LED strings, and wherein a pulse of a first LED string of the plurality of LED strings overlaps at least one pulse of a different LED string of the plurality of LED strings; and
display control logic adapted to activate and deactivate each LED string of the plurality of LED strings in a sequence at the effective frequency of approximately at least 1 kHz.

2. The electronic device of claim 1, comprising a pulse width modulator configured to generate a pulsed signal and transmit the pulsed signal to the display control logic.

3. The electronic device of claim 2, wherein the display control logic is adapted to receive the pulsed signal and utilize the pulsed signal to sequentially activate and deactivate the plurality of LED strings.

4. The electronic device of claim 2, wherein each LED string of the plurality of LED strings comprises a plurality of LEDs.

5. The electronic device of claim 4, wherein each LED string includes six LEDs coupled in series.

6. The electronic device of claim 1, wherein the display control logic is adapted to sequentially activate and deactivate each LED string at a frequency of at least 8 kHz.

7. An electronic device, comprising:
a pulse width modulator (PWM) adapted to generate an oscillating PWM signal at a frequency of at least approximately 1 kHz and at least at a 10-bit brightness resolution; and
a sequencer adapted to receive the oscillating PWM signal and to phase shift the oscillating PWM signal for controlling the activation and deactivation of light emitting diode (LED) string of a plurality of LED strings, wherein each of the light emitting diode strings are activated and deactivated sequentially, wherein an amount of phase shift applied to each LED string is based on a number of LED strings, and wherein a pulse of a first LED string of the plurality of LED strings overlaps at least one pulse of a different LED string of the plurality of LED strings.

8. The electronic device of claim 7, comprising a display, wherein the brightness of the display is controlled by adjusting a duty cycle of the oscillating PWM signal.

9. The electronic device of claim 7, wherein the sequencer phase shifts the oscillating PWM cycle to generate an effective frequency of at least approximately 6 kHz.

10. The electronic device of claim 7, wherein the sequencer phase shifts the oscillating PWM cycle to generate an effective frequency of at least approximately 48 kHz.

11. An electronic device, comprising:
a display having a plurality of light emitting diode (LED) strings adapted to generate light to illuminate a plurality of pixels in the display;
a pulse width modulator (PWM) adapted to generate an oscillating PWM signal; and
display control logic adapted to activate and deactivate the plurality of LED strings sequentially at approximately at least 1 kHz, wherein the display control logic comprises delay circuitry adapted to phase shift the oscillating PWM signal for activation and deactivation of the light source at an effective frequency of at least approximately 10 kHz, wherein an amount of phase shift applied to each LED string is based on a number of LED strings, and wherein a pulse of a first LED sting of the plurality of LED stings overlaps at least one pulse of a different LED sting of the plurality of LED stings.

12. The electronic device of claim 11, wherein each of the LED strings comprises a plurality of LEDs.

13. The electronic device of claim 11, wherein display control logic is adapted to activate and deactivate the plurality of LED strings at approximately at least 8 kHz.

14. The electronic device of claim 11, wherein the PWM modifies a duty cycle of the oscillating PWM signal for control of the brightness of the display.

15. The electronic device of claim 11, wherein the display control logic is configured to lessen a brightness of the display by reducing a level of current through active LED strings if a duty cycle of the PWM signal is to be set below a threshold duty cycle level.

16. The electronic device of claim 11, wherein the display control logic comprises delay circuitry adapted to phase shift the oscillating PWM signal for activation and deactivation of the light source at an effective frequency of at least approximately 48 kHz.

17. A method of providing illumination to a display to reduce visual artifacts, comprising:
generating an oscillating pulse width modulator (PWM) signal in a PWM;
receiving the PWM signal at a sequencer; and
phase shifting and sequentially routing the PWM signal from the sequencer to a plurality of light emitting diode (LED) strings in a display to activate and deactivate the LED stings sequentially at an effective frequency of at least approximately 6 kHz to reduce optical beating resulting from the frequency of the PWM signal and a refresh frequency of the display, wherein an amount of phase shift applied to each LED sting is based on a number of LED stings, and wherein a pulse of a first LED string of the plurality of LED stings overlaps at least one pulse of a different LED sting of the plurality of LED stings.

18. The method of claim 17, comprising adjusting the brightness of the display by adjusting the duty cycle of the PWM signal.

19. The method of claim 18, comprising adjusting the duty cycle of the PWM signal based on user input or based on a determination of the amount of internal power remaining in an internal power source.

20. The method of claim 19, comprising sequentially transmitting the PWM signal to the plurality of LED strings in the display at a frequency of at least approximately 8 kHz.

21. A method for illuminating a display, comprising:
generating light from a light source;

directing the light towards a plurality of pixels in a display; and toggling light emitting diode (LED) stings of the light source on and off sequentially at an effective frequency of approximately at least 48 kHz via a phase shifted pulse width modulator (PWM) signal, wherein an amount of phase shift applied to each LED sting is based on a number of LED stings, and wherein a pulse of a first LED string of the LED stings overlaps at least one pulse of a different LED sting of the LED strings.

22. The method of claim 21, comprising adjusting a duty cycle of the PWM signal in response to user initiated changes of brightness of the display.

23. The method of claim 21, wherein toggling the light source on and off comprises sequentially activating and deactivating at least one light emitting diode (LED) string in the light source.

24. The method of claim 21, wherein toggling the light source on and off comprises sequentially activating and deactivating each of six LED strings in sequence at approximately at least 8 kHz per string.

\* \* \* \* \*